(12) United States Patent
Ogata et al.

(10) Patent No.: US 11,043,886 B2
(45) Date of Patent: Jun. 22, 2021

(54) MOTOR

(71) Applicant: MITSUBA Corporation, Gunma (JP)

(72) Inventors: Naoki Ogata, Gunma (JP); Naoki Shioda, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 16/648,239

(22) PCT Filed: Oct. 30, 2018

(86) PCT No.: PCT/JP2018/040278
§ 371 (c)(1),
(2) Date: Mar. 18, 2020

(87) PCT Pub. No.: WO2019/138662
PCT Pub. Date: Jul. 18, 2019

(65) Prior Publication Data
US 2020/0235648 A1 Jul. 23, 2020

(30) Foreign Application Priority Data
Jan. 10, 2018 (JP) ............................. JP2018-002168

(51) Int. Cl.
*H02K 23/38* (2006.01)
(52) U.S. Cl.
CPC .................................. *H02K 23/38* (2013.01)

(58) Field of Classification Search
CPC ........ H02K 23/00; H02K 23/04; H02K 23/26; H02K 23/38; H02K 3/00; H02K 3/12; H02K 3/18; H02K 3/28
See application file for complete search history.

(56) References Cited

U.S. PATENT DOCUMENTS

2009/0261681 A1* 10/2009 Taguchi ................. H02K 23/32
310/198
2011/0095638 A1* 4/2011 Sakata .................... H02K 23/30
310/179
2012/0194023 A1* 8/2012 Lau ....................... H02K 11/026
310/154.01
2016/0344273 A1* 11/2016 Tamura .................... H02K 1/24
2017/0324313 A1* 11/2017 Hashizume ............ H02K 23/26

FOREIGN PATENT DOCUMENTS

| JP | 2008113485 | 5/2008 |
|---|---|---|
| JP | 2014050178 | 3/2014 |
| JP | 2015177637 | 10/2015 |
| JP | 2017131035 | 7/2017 |

OTHER PUBLICATIONS

"International Search Report (Form PCT/ISA/210) of PCT/JP2018/040278", dated Dec. 25, 2018, with English translation thereof, pp. 1-2.

* cited by examiner

*Primary Examiner* — Tran N Nguyen
(74) *Attorney, Agent, or Firm* — JCIPRNET

(57) ABSTRACT

According to the present invention, a coil is continuously wound in a single pass around each of a series of teeth, and connected to each segment.

1 Claim, 4 Drawing Sheets

MOTOR

CROSS-REFERENCE TO RELATED APPLICATION

This application is a 371 application of the international PCT application serial no. PCT/JP2018/040278, filed on Jan. 10, 2018, which claims the priority benefit of Japan application no. 2018-002168, filed on Jan. 10, 2018. The entirety of each of the above-mentioned patent applications is hereby incorporated by reference herein and made a part of this specification.

TECHNICAL FIELD

The present invention relates to a motor.

RELATED ART

Among motors, there is a three-phase brushed DC motor (hereinafter referred to as a brushed motor) mounted on a vehicle or the like. This brushed motor includes a cylindrical yoke having a permanent magnet attached to an inner peripheral surface thereof, and an armature rotatably provided radially inside the yoke.

The armature has a rotary shaft, an armature core externally fitted and fixed to the rotary shaft, and a commutator externally fitted and fixed to the rotary shaft so as to be adjacent to the armature core.

The armature core has a plurality of teeth extending along a radial direction and disposed radially. Dovetail groove-like slots are formed between each tooth adjacent in a circumferential direction. A coil is wound around each tooth via these slots.

A plurality of segments are disposed on the commutator along the circumferential direction. The coil is connected to these segments. A brush comes into slide contact with each segment. The brush is electrically connected to an external power supply. By applying the power of the external power supply to each segment via the brush, a current is supplied to each coil.

Accordingly, a predetermined magnetic field is formed in the armature core, and magnetic attractive force or repulsive force is generated between the magnetic field and the permanent magnet. Hence, the armature rotates.

In addition, by the rotation of the armature, the segments with which the brush comes into slide contact are sequentially changed, and so-called rectification is performed in which the direction of the current supplied to the coil is switched. Accordingly, the armature continuously rotates.

As a means of reducing the size and weight of the motor, it is conceivable to increase the number of poles of the permanent magnet. By increasing the number of poles, it is possible to reduce the amount of effective magnetic flux per magnetic pole. As a result, the armature core that forms magnetism can be reduced in size and weight.

If it is simply attempted to increase the number of poles, the number of slots increases. Thus, if an outer diameter of the armature core is to be kept constant, the slots may become small. As a result, a coil winding operation may become difficult. Hence, various techniques have been proposed capable of downsizing the motor while facilitating the coil winding operation.

For example, there are six teeth and twelve segments, and when the teeth are sequentially numbered from 1 to 6 in the circumferential direction and the segments are sequentially numbered from 1 to 12 in the circumferential direction, a winding start terminal of the coil is connected to the seventh segment. The coil is connected from the seventh segment to the first segment, and is wound around the first tooth in a forward direction from the first segment. The coil is connected from the first tooth to the second segment, and is connected from the second segment to the eighth segment. The coil is wound around the third tooth in a reverse direction from the eighth segment, and is connected from the third tooth to the third segment. The coil is connected from the third segment to the ninth segment, and is wound around the fifth tooth in the forward direction from the ninth segment. The coil is connected from the fifth tooth to the tenth segment, and is connected from the tenth segment to the fourth segment. The coil is wound around the first tooth in the reverse direction from the fourth segment, and is connected from the first tooth to the eleventh segment. The coil is connected from the eleventh segment to the fifth segment, and is wound around the third tooth in the forward direction from the fifth segment. The coil is connected from the third tooth to the sixth segment, and is connected from the sixth segment to the twelfth segment. The coil is wound around the fifth tooth in the reverse direction from the twelfth segment. A winding end terminal pulled out from the fifth tooth is again connected to the seventh segment. The segments having the same potential are short-circuited by an equalizer (connection line) (for example, see Patent Document 1).

For example, each tooth includes a first coil electrically connected between adjacent segments and wound in the forward direction, and a second coil electrically connected between other adjacent segments and wound in the reverse direction. Relative positions of the segment to which the winding start terminal of the first coil is connected and the segment to which the winding start terminal of the second coil is connected are set to correspond to relative positions of a pair of brushes. The segments having the same potential are short-circuited by an equalizer (connection line) (for example, see Patent Document 2).

PRIOR-ART DOCUMENTS

Patent Documents

Patent Document 1: Japanese Laid-open No 2017-131035
Patent Document 2: Japanese Laid-open No. 2008-113485

SUMMARY OF THE INVENTION

Problems to be Solved by the Invention

However, in Patent Document 1 described above, segments exist to which the coil wound around the teeth is not connected. In the case where a brush comes into slide contact with such a segment, the value of the current flowing through the equalizer may increase, and there is a possibility that the equalizer may be damaged. In addition, since the equalizer needs to be pulled around by another apparatus, there is a possibility that a winding device may become complex.

A more specific description is given based on FIG. 4.

FIG. 4 is an explanatory diagram showing an electric circuit of a coil 207 in Patent Document 2.

As shown in FIG. 4, for example, in the case where a brush 222 is in slide contact with the first segment 214 and the fourth segment 214 respectively, the coil 207 is in a form in which electric circuits are connected in parallel between the seventh segment 214 connected with the first segment 214 via an equalizer 252 and the tenth segment 214 connected with the fourth segment 214 via the equalizer 252.

Hence, for example, in the case where a current supplied to the brush 222 has a current value of 4[i], although a current supplied to the coil 207 has a current value of 2[i], a current supplied to the equalizer 252 between the first and seventh segments 214 has a current value of 4[i]. Similarly, the current supplied to the equalizer 252 between the fourth and tenth segments 214 also has a current value of 4[i].

In this way, the value of the current flowing through the equalizer 252 may increase, and there is a possibility that the equalizer 252 may be damaged.

In contrast, in Patent Document 2 described above, since the coil wound around the teeth is connected to each segment, the value of the current flowing through the equalizer can be reduced as compared with Patent Document 1 However, to realize a coil winding structure as in Patent Document 2, it is necessary for the winding device to perform the coil winding operation on two coils simultaneously by a so-called double flyer that has two flyers for drawing the coils. For this reason, the winding device becomes complex. In addition, since the double flyer is used, the amount of winding of the coil is increased, and there is a problem that it is difficult to improve a space factor of the coil.

It is not impossible to perform the coil winding operation by a single flyer having one flyer, instead of using the double flyer. However, even if it is attempted to wind the coil by the single flyer as by the double flyer, if the same number of turns as that of the double flyer is not reached, it is difficult to achieve the same motor characteristics, and the number of winding steps may simply be doubled. In addition, when the coil is pulled around in order to be wound around each tooth, the previously wound coil causes interference and the winding operation itself is troublesome.

Therefore, the present invention provides a motor that can be reduced in size and that is capable of reducing the value of the current flowing through the equalizer, simplifying the winding device, improving the space factor of the coil, and facilitating the winding operation.

Means for Solving the Problems

In order to solve the above problems, according to a first aspect of the present invention, a motor includes: a yoke having four magnetic poles; an armature core, having a rotary shaft rotatably provided radially inside the yoke, six teeth attached to the rotary shaft and extending radially outward, and six slots formed between each of the teeth adjacent in a circumferential direction, a coil wound around each of the teeth; a commutator provided adjacent to the armature core on the rotary shaft, on which twelve segments are disposed in the circumferential direction; and a plurality of brushes supplying power to the coil via each of the segments. When the teeth are sequentially numbered from 1 to 6 in the circumferential direction and the segments are sequentially numbered from 1 to 12 in the circumferential direction, a winding start terminal of the coil is connected to the first segment, and the coil is pulled around in one direction in a rotational direction of the rotary shaft from the first segment and wound around the fifth tooth in a forward direction, pulled around in the one direction from the fifth tooth and wound around the second tooth in the forward direction, pulled around in the one direction from the second tooth and connected to the twelfth segment, pulled around in the one direction from the twelfth segment and connected to the sixth segment, pulled around in the one direction from the sixth segment and wound around the sixth tooth in a reverse direction opposite the forward direction, pulled around in the one direction from the sixth tooth and wound around the third tooth in the reverse direction, pulled around in the one direction from the third tooth and connected to the eleventh segment, pulled around in the one direction from the eleventh segment and connected to the fifth segment, pulled around in the one direction from the fifth segment and wound around the first tooth in the forward direction, pulled around in the one direction from the first tooth and wound around the fourth tooth in the forward direction, pulled around in the one direction from the fourth tooth and connected to the fourth segment, pulled around in the one direction from the fourth segment and connected to the tenth segment, pulled around in the one direction from the tenth segment and wound around the second tooth in the reverse direction, pulled around in the one direction from the second tooth and wound around the fifth tooth in the reverse direction, pulled around in the one direction from the fifth tooth and connected to the third segment, pulled around in the one direction from the third segment and connected to the ninth segment, pulled around in the one direction from the ninth segment and wound around the third tooth in the forward direction, pulled around in the one direction from the third tooth and wound around the sixth tooth in the forward direction, pulled around in the one direction from the sixth tooth and connected to the eighth segment, pulled around in the one direction from the eighth segment and connected to the second segment, pulled around in the one direction from the second segment and wound around the fourth tooth in the reverse direction, pulled around in the one direction from the fourth tooth and wound around the first tooth in the reverse direction, pulled around in the one direction from the first tooth and connected to the seventh segment, and pulled around in the one direction from the seventh segment and connected to the first segment.

By being configured in this way, the motor can be reduced in size, and the coil wound around the teeth can be connected to each segment. Hence, it can be prevented that a value of a current flowing through the coil connecting the segments having the same potential may increase.

In addition, by a single flyer, the coil winding operation can be performed continuously in a single stroke. Hence, a winding device can be simplified and the coil winding operation can be facilitated.

Here, copper forming each coil is coated. At that time, the coating is performed in which the amount of coating has substantially the same thickness even when wire diameters are different. Hence, compared to the case where the coil is wound by a double flyer, in the case where the coil is wound by a single flyer, the number of turns of the coil can be reduced and the amount of coating can be reduced. As a result, it is possible to improve the space factor of the coil.

Effects of the Invention

According to the above motor, a motor can be provided that can be reduced in size and that is capable of reducing a value of a current flowing through a connection line, simplifying a winding device, improving a space factor of a coil, and facilitating a winding operation.

DESCRIPTION OF THE EMBODIMENTS

Next, an embodiment of the present invention is described based on the drawings.

(Brushed Motor)

Figure 1:
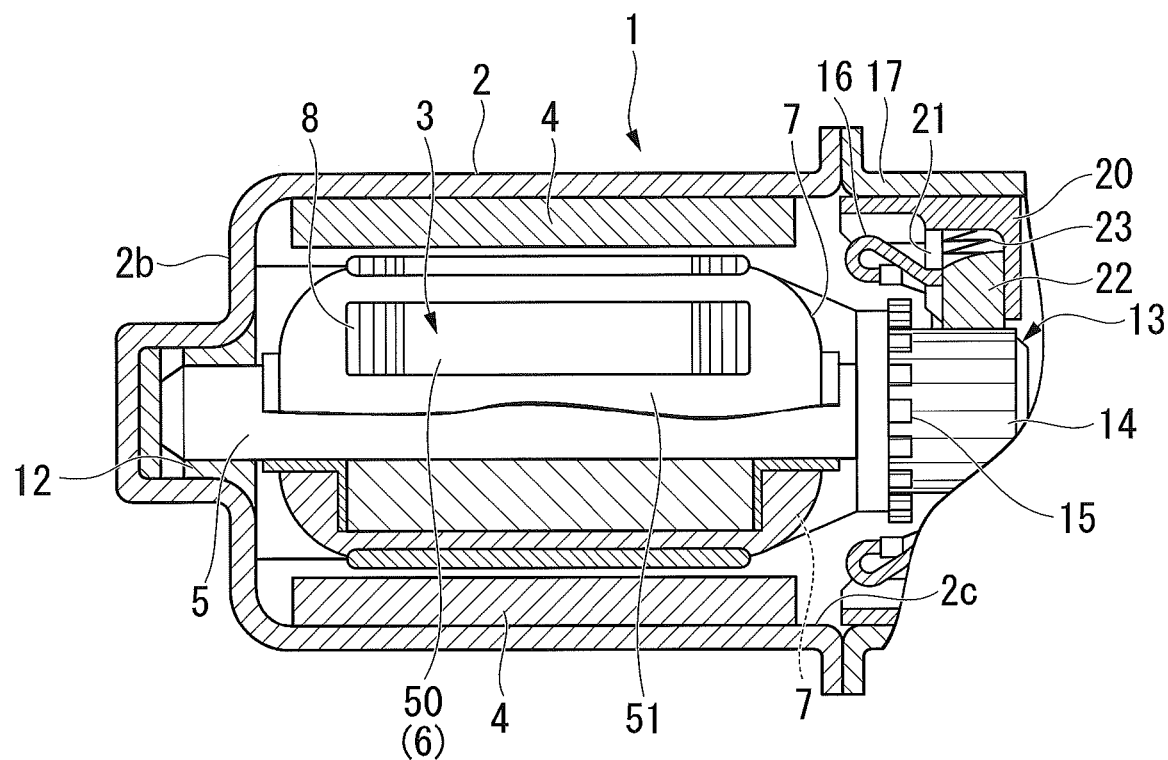
FIG. 1 is a cross-sectional view of a brushed motor along an axial direction according to an embodiment of the present invention.

FIG. 1 is a cross-sectional view of a brushed motor 1 along an axial direction.

The brushed motor 1 is, for example, used as a driving source for electrical equipment mounted on a vehicle.

As shown in FIG. 1, the brushed motor 1 includes an armature 3 rotatably provided in a substantially bottomed cylindrical yoke 2, and an opening part 2c of the yoke 2 is closed with an end bracket 17.

Four permanent magnets 4 are fixed to an inner peripheral surface of the yoke 2 in a circumferential direction. That is, there are four magnetic poles.

The armature 3 includes an armature core 6 fixed to a rotary shaft 5, a coil 7 wound around the armature core 6, and a commutator 13 disposed at one end of the armature core 6. The armature core 6 is formed by, for example, laminating a plurality of ring-shaped metal plates 8 in the axial direction. However, the armature core 6 may be formed by compression molding soft magnetic powder.

On an outer peripheral part of the metal plates 8, six T-shaped teeth 50 are formed radially at equal intervals along the circumferential direction when viewed from the axial direction Since the plurality of metal plates 8 are externally fitted to the rotary shaft 5, dovetail groove-like slots 51 are formed between adjacent teeth 50 on an outer periphery of the armature core 6. The slots 51 extend along the axial direction, and there are six slots 51 formed at equal intervals along the circumferential direction. Through these slots 51, the coil 7 is wound around the teeth 50 by a concentrated winding method (the details will be described later).

The commutator 13 is externally fitted and fixed to one end of the rotary shaft 5. Twelve segments 14 formed of a conductive material are attached to an outer peripheral surface of the commutator 13. In this way, the brushed motor 1 of the present embodiment is a so-called four-pole six-slot twelve-segment (double segment) motor, having four permanent magnets 4 (the number of magnetic poles is four), six slots 51 (six teeth 50), and twelve segments 14.

The segments 14 are formed of plate-shaped metal pieces that are long in the axial direction, and are fixed in parallel at equal intervals along the circumferential direction while being insulated from each other. At an end part of each segment 14 toward the armature core 6, a riser 15 bent in the form of being folded back to an outer diameter side is formed integrally with the segment 14. The coil 7 wound around the teeth 50 is wound around the riser 15 and fixed by, for example, fusing. Accordingly, the segments 14 and the corresponding coil 7 are electrically connected.

In addition, the coil 7 is connected so that predetermined two of the segments 14, that is, two segments 14 having the same potential, are short-circuited (see FIG. 2; the details will be described later). The coil 7 that short-circuits the two segments 14 having the same potential functions as an equalizer (connection line) 52. These equalizers 52 are also wound around the riser 15 of the predetermined segments 14 and fixed by, for example, fusing.

The other end of the rotary shaft 5 is rotatably supported by a bearing 12 in a boss formed protruding from a bottom part 2b of the yoke 2. The end bracket 17 is provided at an end of the yoke 2 toward the opening part 2c. A holder stay 20 is attached inside the end bracket 17. A pair of brush holders 21 at a 90° interval in the circumferential direction, for example, is formed on the holder stay 20. The brush holders 21 are respectively equipped with brushes 22 that are freely retractable while being energized via a spring 23.

Each brush 22 is electrically connected to an external power supply via a pigtail 16. Each brush 22 is classified into a positive brush and a negative brush. Tip parts of these brushes 22 come into slide contact with the commutator 13 because they are energized by the spring 23, and external power is supplied to the commutator 13 via the brushes 22.

(Coil Winding Method)

Figure 2:
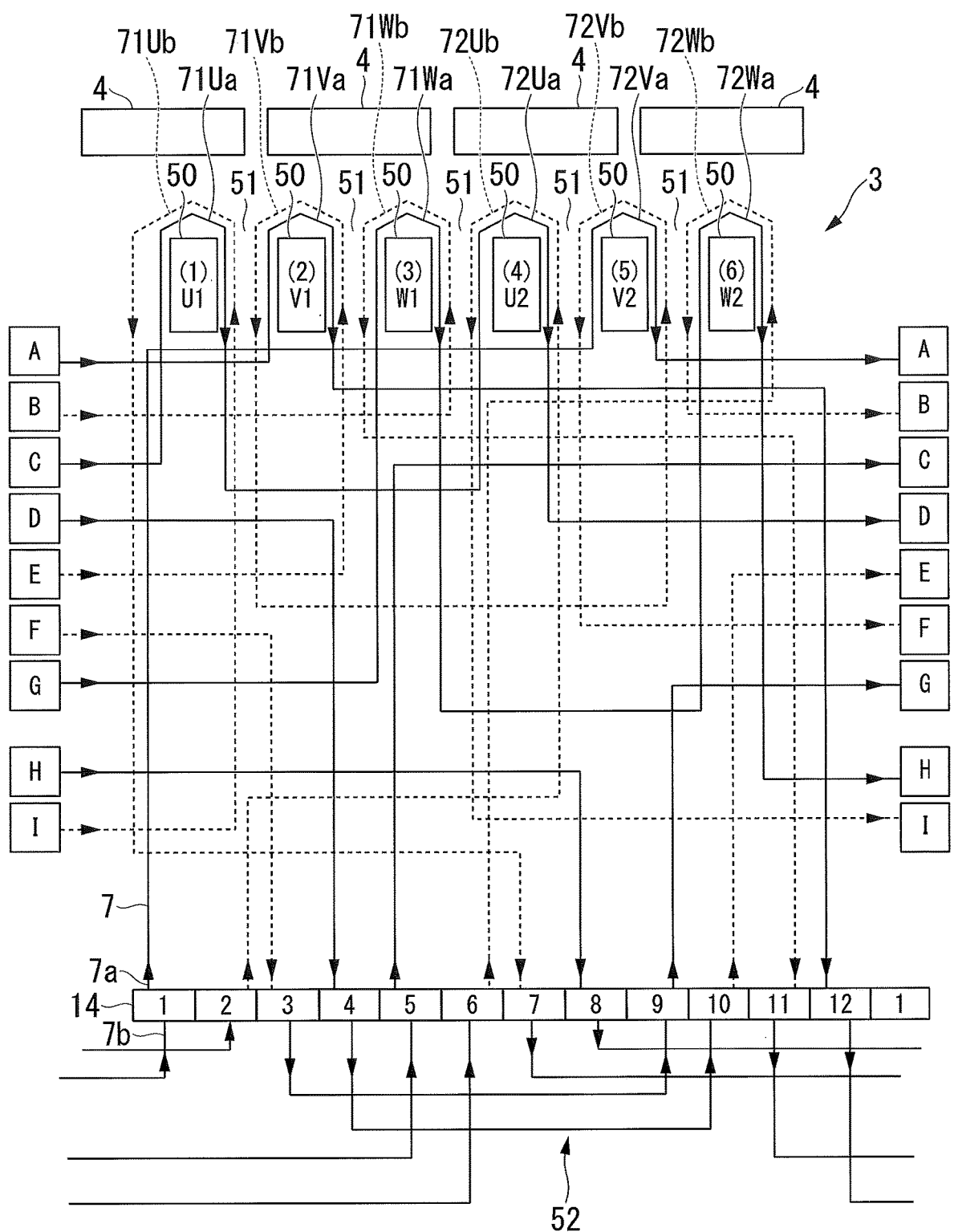
FIG. 2 is an expanded view of permanent magnets, teeth, segments, and a coil according to an embodiment of the present invention.

Next, a method for winding the coil 7 is described based on FIG. 2.

FIG. 2 is an expanded view of the permanent magnets 4 as well as the teeth 50, the segments 14, and the coil 7 (equalizers 52) of the armature 3, wherein gaps between the adjacent teeth 50 correspond to the slots 51.

As shown in FIG. 2, the armature 3 has a three-phase (U-phase, V-phase, and W-phase) structure, and each tooth 50 is assigned as the U-phase, the V-phase, and the W-phase in this order along the circumferential direction. In the following description, the phases and numbers assigned to each tooth 50 are sequentially assigned, and each segment 14 is sequentially numbered in the circumferential direction and described. Although in FIG. 2, each segment 14 is numbered so that the first segment 14 is located in the vicinity of the tooth 50 numbered U1(1), the present invention is not limited thereto and the location of the first segment 14 can be set arbitrarily.

The coil 7 is continuously pulled around each tooth 50 and each segment 14 in a single stroke. In addition, the coil 7 is always pulled around in one direction in a rotational direction of the armature 3 (rotary shaft 5). In FIG. 2, the coil 7 is pulled around to the right.

That is, firstly, a winding start terminal 7a of the coil 7 is connected to the first segment 14. Subsequently, the coil 7 is wound around the tooth 50 numbered V2(5) in a forward direction (clockwise direction in FIG. 2) from the first segment 14 to form a second V-phase forward coil 72Va.

Subsequently, the coil 7 is pulled out from the tooth 50 numbered V2(5), and the coil 7 is wound around the tooth 50 numbered V1(2) in the forward direction to form a first V-phase forward coil 71Va.

Subsequently, the coil 7 is pulled out from the tooth 50 numbered V1(2), and the coil 7 is wound around the riser 15 of the twelfth segment 14.

Subsequently, the coil 7 is wound around the riser 15 of the sixth segment 14 from the twelfth segment 14.

Subsequently, the coil 7 is pulled out from the sixth segment 14, and the coil 7 is wound around the tooth 50 numbered W2(6) in a reverse direction (counterclockwise direction in FIG. 2) to form a second W-phase reverse coil 72Wb.

Subsequently, the coil 7 is pulled out from the tooth 50 numbered W2(6), and the coil 7 is wound around the tooth 50 numbered W1(3) in the reverse direction to form a first W-phase reverse coil 71Wb.

Subsequently, the coil 7 is pulled out from the tooth 50 numbered W1(3), and the coil 7 is wound around the riser 15 of the eleventh segment 14.

Subsequently, the coil 7 is wound around the riser 15 of the fifth segment 14 from the eleventh segment 14.

Subsequently, the coil 7 is pulled out from the fifth segment 14, and the coil 7 is wound around the tooth 50 numbered U1(1) in the forward direction to form a first U-phase forward coil 71Ua.

Subsequently, the coil 7 is pulled out from the tooth 50 numbered U1(1), and the coil 7 is wound around the tooth 50 numbered U2(4) in the forward direction to form a second U-phase forward coil 72Ua.

Subsequently, the coil 7 is pulled out from the tooth 50 numbered U2(4), and the coil 7 is wound around the riser 15 of the fourth segment 14.

Subsequently, the coil 7 is wound around the riser 15 of the tenth segment 14 from the fourth segment 14.

Subsequently, the coil 7 is pulled out from the tenth segment 14, and the coil 7 is wound around the tooth 50 numbered V1(2) in the reverse direction to form a first V-phase reverse coil 71Vb.

Subsequently, the coil 7 is pulled out from the tooth 50 numbered V1(2), and the coil 7 is wound around the tooth 50 numbered V2(5) in the reverse direction to form a second V-phase reverse coil 72Vb.

Subsequently, the coil 7 is pulled out from the tooth 50 numbered V2(5), and the coil 7 is wound around the riser 15 of the third segment 14.

Subsequently, the coil 7 is wound around the riser 15 of the ninth segment 14 from the third segment 14.

Subsequently, the coil 7 is pulled out from the ninth segment 14, and the coil 7 is wound around the tooth 50 numbered W1(3) in the forward direction to form a first W-phase forward coil 71Wa.

Subsequently, the coil 7 is pulled out from the tooth 50 numbered W1(3), and the coil 7 is wound around the tooth 50 numbered W2(6) in the forward direction to form a second W-phase forward coil 72Wa.

Subsequently, the coil 7 is pulled out from the tooth 50 numbered W2(6), and the coil 7 is wound around the riser 15 of the eighth segment 14.

Subsequently, the coil 7 is wound around the riser 15 of the second segment 14 from the eighth segment 14.

Subsequently, the coil 7 is pulled out from the second segment 14, and the coil 7 is wound around the tooth 50 numbered U2(4) in the reverse direction to form a second U-phase reverse coil 72Ub.

Subsequently, the coil 7 is pulled out from the tooth 50 numbered U2(4), and the coil 7 is wound around the tooth 50 numbered U1(1) in the reverse direction to form a first U-phase reverse coil 71Ub.

Subsequently, the coil 7 is pulled out from the tooth 50 numbered U1(1), and the coil 7 is wound around the riser 15 of the seventh segment 14.

Subsequently, the coil 7 is pulled out from the seventh segment 14, and a winding end terminal 7b of the coil 7 is connected to the first segment 14. Accordingly, a winding operation of the coil 7 is completed.

(About Electric Circuit of Coil)

Next, an electric circuit of the coil 7 wound as described above is described based on FIG. 3.

Figure 3:
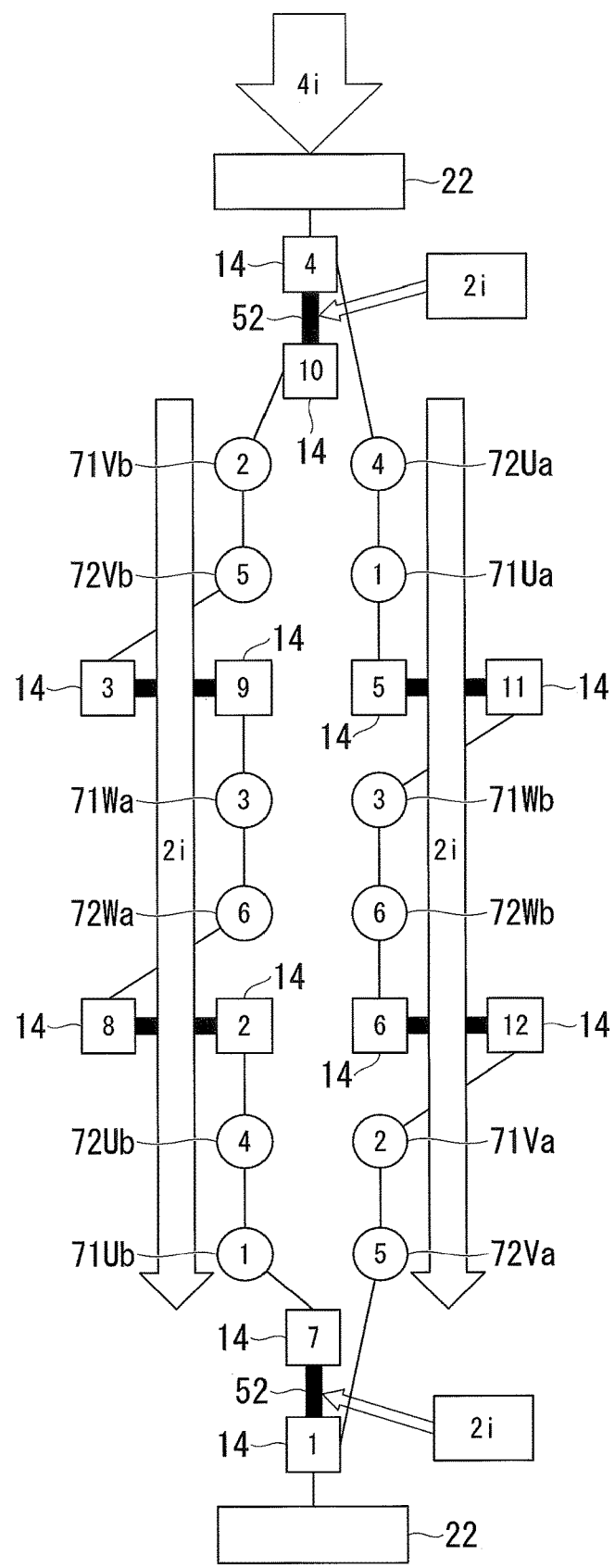
FIG. 3 is an explanatory diagram showing an electric circuit of a coil according to an embodiment of the present invention.
Figure 4:
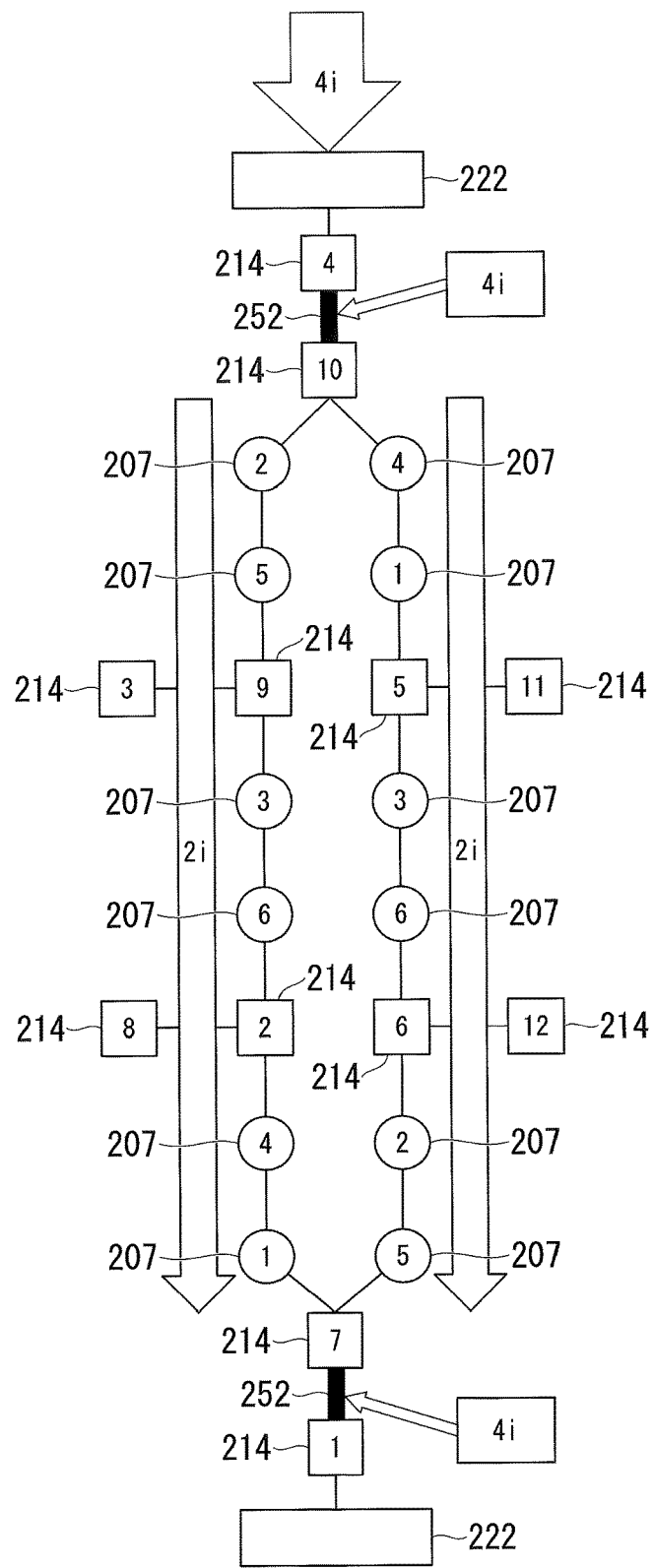
FIG. 4 is an explanatory diagram showing an electric circuit of a conventional coil.

FIG. 3 is an explanatory diagram showing an electric circuit of the coil 7.

As shown in FIG. 3, for example, in the case where the brush 22 is in slide contact with the first segment 14 and the fourth segment 14 respectively, a circuit to which the coil 7 is connected in series is formed between the first and fourth segments 14, and a circuit to which the coil 7 is connected in series is formed between the seventh and tenth segments 14. These two circuits are connected in parallel. Hence, for example, in the case where a current value supplied to the brush 22 is 4[i], currents supplied to each circuit each have a current value of 2[i] In addition, a current supplied to the equalizer 52 also has a current value of 2[i].

In this way, in the above-described embodiment, while the brushed motor 1 can be reduced in size, the coil 7 wound around each tooth 50 can be connected to each segment 14. Hence, it can be prevented that the value of the current flowing through the coil 7 connecting the segments 14 having the same potential may increase.

In addition, by a single flyer, the winding operation of the coil 7 can be performed continuously in a single stroke. Hence, a winding device can be simplified and the winding operation of the coil 7 can be facilitated.

In addition, compared to the case where the coil 7 is wound by a double flyer, since the coil 7 is wound by a single flyer, the number of turns of the coil 7 can be reduced, and the amount of coating of the coil 7 can be reduced. As a result, it is possible to improve a space factor of the coil 7.

The present invention is not limited to the above-described embodiment, and includes various modifications of the above-described embodiment without departing from the spirit of the present invention.

For example, in the above-described embodiment, the case is described where the brushed motor 1 is used as the driving source for electrical equipment (for example, a power window) mounted on a vehicle. However, the present invention is not limited thereto, and the brushed motor 1 can be employed for driving various machines.

INDUSTRIAL APPLICABILITY

According to the above motor, a motor can be provided that can be reduced in size and that is capable of reducing a value of a current flowing through a connection line, simplifying a winding device, improving a space factor of a coil, and facilitating a winding operation.

What is claimed is:
1. A motor, comprising:
a yoke having four magnetic poles;
an armature core, having a rotary shaft rotatably provided radially inside the yoke, six teeth attached to the rotary shaft and extending radially outward, and six slots formed between each of the teeth adjacent in a circumferential direction;
a coil wound around each of the teeth;
a commutator provided adjacent to the armature core on the rotary shaft, on which twelve segments are disposed in the circumferential direction; and
a plurality of brushes supplying power to the coil via each of the segments, wherein
when the teeth are sequentially numbered from 1 to 6 in the circumferential direction and the segments are sequentially numbered from 1 to 12 in the circumferential direction,
a winding start terminal of the coil is connected to the first segment, and the coil is
pulled around in one direction in a rotational direction of the rotary shaft from the first segment and wound around the fifth tooth in a forward direction, pulled around in the one direction from the fifth tooth and wound around the second tooth in the forward direction, pulled around in the one direction from the second tooth and connected to the twelfth segment, pulled around in the one direction from the twelfth segment and connected to the sixth segment, pulled around in the one direction from the sixth segment and wound around the sixth tooth in a reverse direction opposite the forward direction, pulled around in the one direction from the sixth tooth and wound around the third tooth in the reverse direction, pulled around in the one direction from the third tooth and connected to the eleventh segment, pulled around in the one direction from the eleventh segment and connected to the fifth segment, pulled around in the one direction from the fifth segment and wound around the first tooth in the forward direction, pulled around in the one direction from the first tooth and wound around the fourth tooth in the forward direction, pulled around in the one direction from the fourth tooth and connected to the fourth segment, pulled around in the one direction from the fourth segment and connected to the tenth segment, pulled around in the one direction from the tenth segment and wound around the second tooth in the reverse direction, pulled around in the one direction from the second tooth and wound around the fifth tooth in the reverse direction, pulled around in the one direction from the fifth tooth and connected to the third segment, pulled around in the one direction from the third segment and connected to the ninth segment, pulled around in the one direction from the ninth segment and wound around the third tooth in the forward direction, pulled around in the one direction from the third tooth and wound around the sixth tooth in the forward direction, pulled around in the one direction from the sixth tooth and connected to the eighth segment, pulled around in the one direction from the eighth segment and connected to the second segment, pulled around in the one direction from the second segment and wound around the fourth tooth in the reverse direction, pulled around in the one direction from the fourth tooth and wound around the first tooth in the reverse direction, pulled around in the one direction from the first tooth and connected to the seventh segment, and pulled around in the one direction from the seventh segment and connected to the first segment.

\* \* \* \* \*